US006449747B2

(12) United States Patent
Wuytack et al.

(10) Patent No.: US 6,449,747 B2
(45) Date of Patent: Sep. 10, 2002

(54) METHOD FOR DETERMINING AN OPTIMIZED MEMORY ORGANIZATION OF A DIGITAL DEVICE

(75) Inventors: Sven Wuytack, Herent; Francky Catthoor, Temse; Hugo De Man, Leuven, all of (BE)

(73) Assignee: Imec VZW (BE)

( * ) Notice: Subject to any disclaimer, the term of this patent is extended or adjusted under 35 U.S.C. 154(b) by 0 days.

(21) Appl. No.: 09/823,409

(22) Filed: Mar. 30, 2001

Related U.S. Application Data

(63) Continuation of application No. 09/360,140, filed on Jul. 23, 1999.
(60) Provisional application No. 60/094,124, filed on Jul. 24, 1998.

(51) Int. Cl.[7] .............................................. G06F 17/50
(52) U.S. Cl. .......................................... 716/2; 717/151
(58) Field of Search .............................. 716/2; 717/151

(56) References Cited

U.S. PATENT DOCUMENTS

| | | | |
|---|---|---|---|
| 5,202,975 A | * 4/1993 | Rasbold et al. | 717/138 |
| 5,327,561 A | 7/1994 | Choi et al. | |
| 5,742,814 A | * 4/1998 | Balasa et al. | 707/102 |
| 5,930,510 A | * 7/1999 | Beylin et al. | 717/161 |
| 6,151,705 A | * 11/2000 | Santhanam | 717/153 |

OTHER PUBLICATIONS

M. Al–Mouhamed, et al., "A Heuristic Storage for Minimizing Access Time of Arbitrary Data Patterns", IEEE Transactions on Parallel and Distributed Systems, vol. 8 No. 4, Apr. 1997.
F. Balassa, et al., "Dataflow–driven Memory Allocation for Multi–dimensional Signal Processing Systems", Proceedings IEEE International Conference on Computer Aided Design, San Jose, CA, Nov. 1994, pps. 31–34.

P. Lippens, et al., "Allocation of Multiport Memories for Hierarchical Data Streams", Proceedings IEEE International Conference on Computer Aided Design, pps. 728–735, Santa Clara, Nov. 1993.
S. S. Pinter, "Register Allocation with Instruction Scheduling A New Approach", ACM SIGPLAN Notices, vol. 28, pp. 248–257, Jun. 1993.
O. Sentieys, et al., "Memory Module Selection For High Level Synthesis", Proceedings IEEE Workshop on VLSI Signal Processing, Monterey, CA, Oct. 1996, pps. 272–283.
L. Stok, "Data Path Synthesis", The VLSI Journal, vol. 18, pp. 1–71, Jun. 1994.
W. Verhaegh, et al., "Improved Force–Directed Scheduling in High–Throughput Digital Signal Processing", IEEE Transactions on CAD and Systems, vol. 14, No. 8, Aug. 1995, pps. 945–960.
S. Wuytack, et al., "Flow Graph Balancing for Minimizing the Required Memory Bandwidth", IEEE System Synthesis, 1996 proceedings, 9th edition.

* cited by examiner

*Primary Examiner*—John F. Niebling
*Assistant Examiner*—Stacy Whitmore
(74) *Attorney, Agent, or Firm*—Knobbe, Martens, Olson & Bear, LLP

(57) ABSTRACT

A system and method for determining optimized scheduling intervals and optimized access conflicts and for determining an optimized memory organization of an essentially digital device. The system includes an optimizer for determining an optimized scheduling of the data access instructions for a plurality of disjunct code blocks, wherein each of the code blocks include part of the data access instructions. The system performs an iterative process of successively reducing the cycle budget for selected blocks and modifying the scheduling of the selected blocks until a cumulative cycle budget for all of the blocks is met.

36 Claims, 12 Drawing Sheets

Figure 1: The distribution over loops has a big impact on the memory architecture.

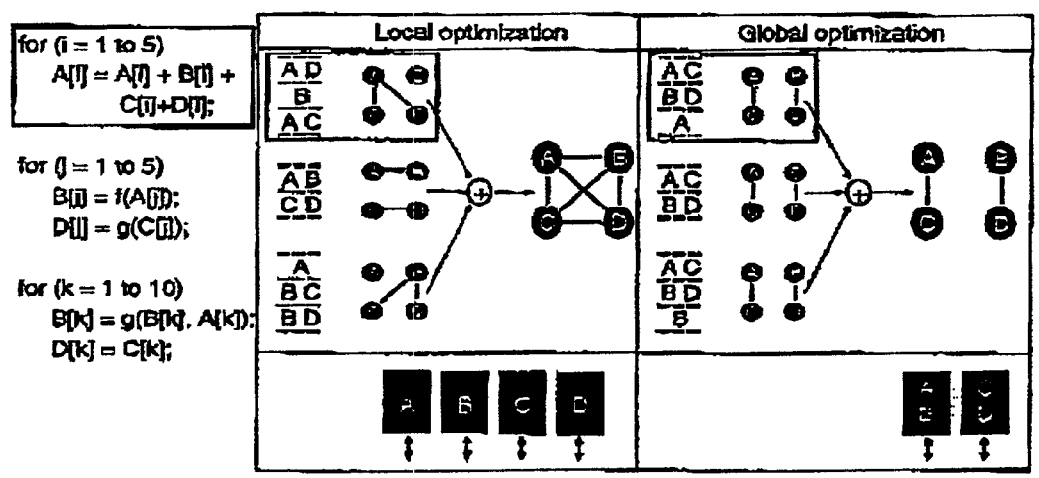
Figure 2: Global optimum instead of local optima.

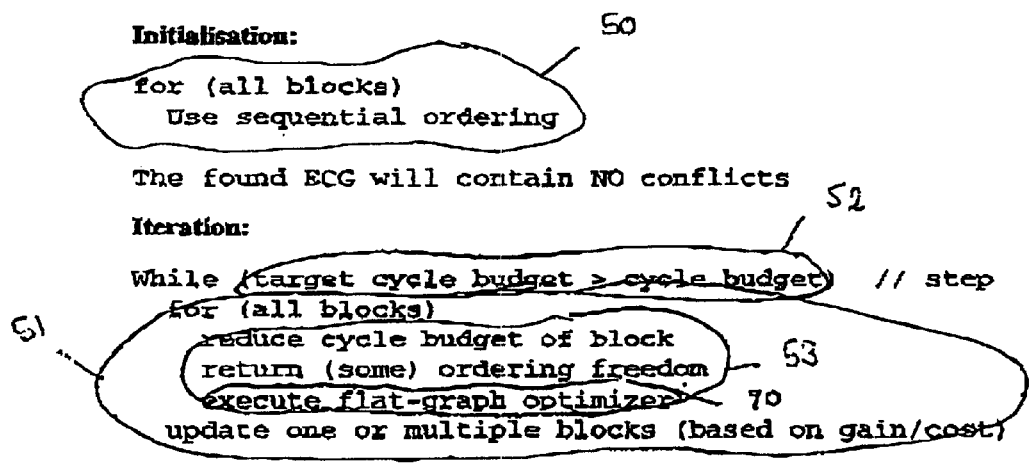
Figure 3: Basic algorithm for incremental SCBD.

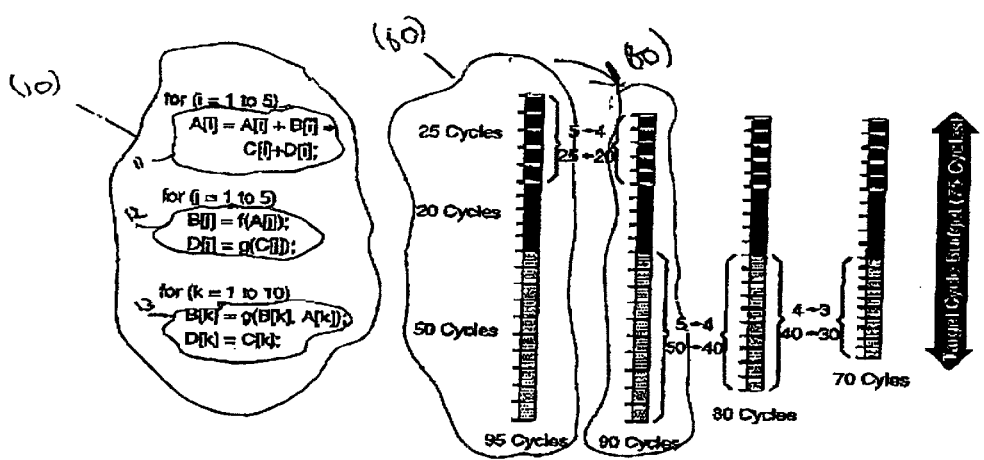
Figure 4: Graphical representation of incremental SCBD.

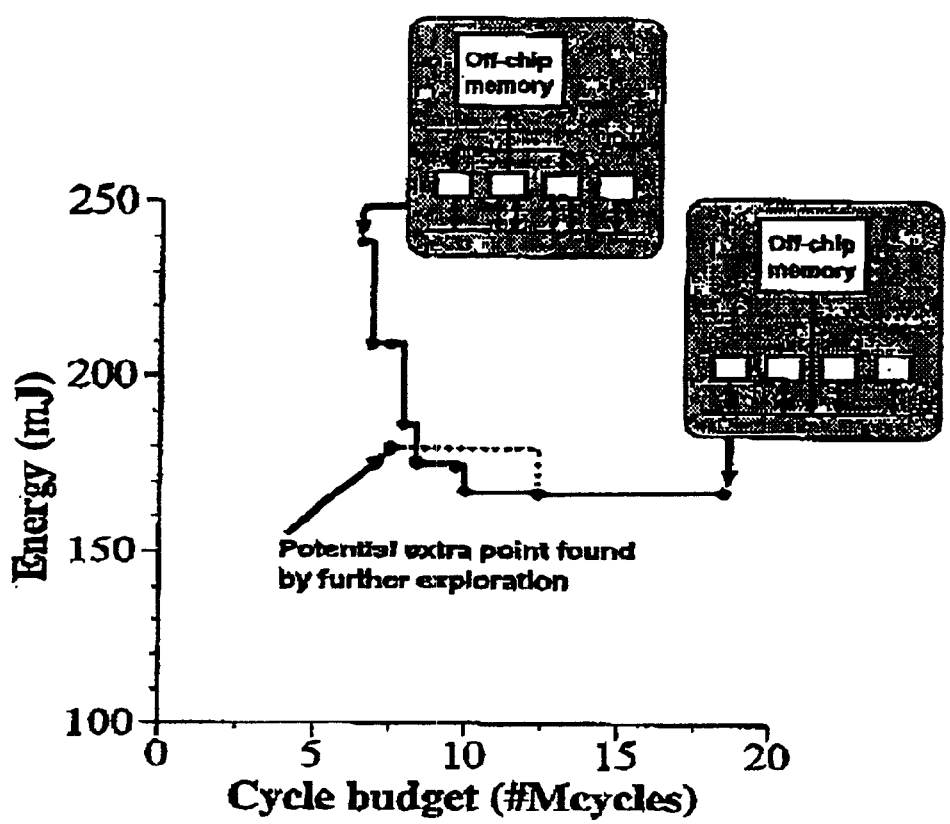
Figure 5: Pareto curve for Binary Tree Predictive Coder.

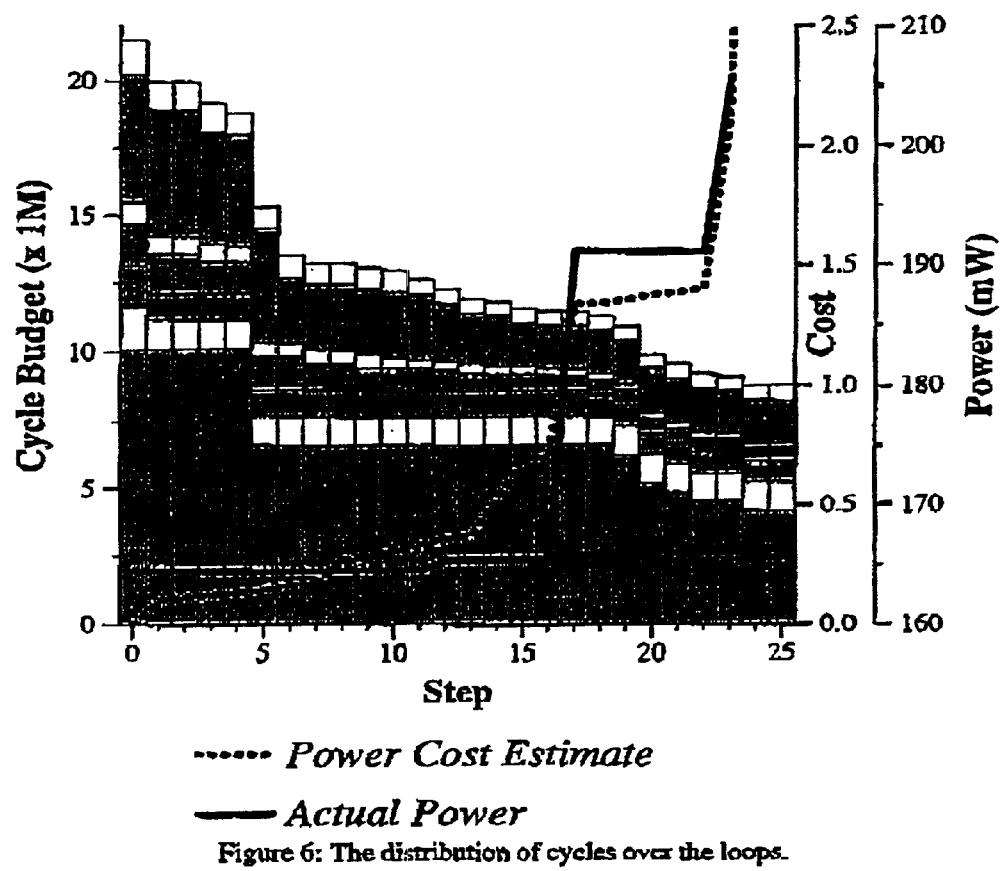
Figure 6: The distribution of cycles over the loops.

METHOD FOR DETERMINING AN OPTIMIZED MEMORY ORGANIZATION OF A DIGITAL DEVICE

RELATED APPLICATIONS

This application is a continuation of and incorporates by reference U.S. application No. 09/360,140, filed on Jul. 23, 1999, which in turn claims priority to U.S. provisional application No. 60/094,124, filed Jul. 24, 1998.

FIELD OF THE INVENTION

The invention relates to methods for designing essentially digital devices.

BACKGROUND OF THE INVENTION

An essentially digital device comprises at least of a memory organization (an amount of memories with their sizes and an interconnection pattern) and registers. Such a memory organization is determined during the design process of said digital device. The operation of an essentially digital system can essentially be described as a set of data access operations or instructions on data structures or variables, being stored in said memories.

In [L.Stok, Data path synthesis, integration, the VLSI journal, Vol.18, pp.1–71, June 1994.] register allocation, starting from a fully scheduled flow graph (thus ordered data access operations or instructions are used as input), are presented. Said allocation techniques are scalar oriented. Many of these techniques construct a scalar conflict or compatibility graph and solve the problem using graph coloring or clique partitioning. This conflict graph is fully determined by the schedule which is fixed before. This means that no effort is spent to come up with an optimal conflict graph and thus the potential optimization by reconsidering the schedule is not exploited. Moreover only register allocation is addressed and not memories.

In the less explored domain of memory allocation and assignment for hardware systems, the current techniques start from a given schedule [L.Ramachandran, D.Gajski, V.Chaiyakul, An algorithm for array variable clustering, Proceedings European Design and Test Conference, pp.262–266, Paris, Mar. 1994.], [P.Lippens, J.van Meerbergen, W.Verhaegh, A.van der Werf, Allocation of multiport memories for hierarchical data streams, Proceedings IEEE International Conference on Computer-Aided Design, pp.728–735, Santa Clara, Nov. 1993.], [O.Sentieys, D. Chillet, J. P.Diguet, J.Philippe, Memory module selection for high-level synthesis, Proceedings IEEE workshop on VLSI signal processing, Monterey Calif., October 1996.] or perform first a bandwidth estimation step [F.Balasa, F.Catthoor, H.DeMan, "Dataflow-driven memory allocation for multi-dimensional processing systems," Proceedings IEEE International Conference on Computer Aided Design}, San Jose Calif., Nov. 1994.] which is a kind of crude ordering that does not really optimize the conflict graph either. These techniques have to operate on groups of signals instead of on scalars to keep the complexity acceptable.

In the parallel compiler domain [M.Al-Mouhamed, S.Seiden, A heuristic storage for minimizing access time of arbitrary data patterns, IEEE Transactions on Parallel and Distributed Systems, Vol.8, No.4, pp.441–447, Apr. 1997.] proposes a technique to partition arrays into groups of data that have to be assigned to different memories such that they can be accessed simultaneously for an SIMD architecture. They combine the constraints of a number of given access patterns into a single linear address transformation that calculates for every data element the memory in which it should be stored to minimize the total access time. This technique allows to avoid the allocation of multi-port memories for storing data with self-conflicts, by explicitly splitting arrays into smaller arrays that can be assigned to single port memories. However said method does not exploit all optimization opportunities for instance by rescheduling data access instructions.

[S.Pinter, Register allocation with instruction scheduling: a new approach, ACM SIGPLAN Notices, Vol.28, pp.248–257, Jun. 1993.] optimizes a conflict graph in the context of scalar register allocation by removing weighted edges in a coloring problem prior to scheduling. However, the conflicts in their initial conflict graph are determined by the sequential ordering of the input code. Also this idea was not applied to groups of scalars.

The Improved Force Directed Scheduling (IFDS) [W.Verhaegh, P.Lippens, E.Aarts, J.Korst, J.van Meerbergen, A.van der Werf, Improved force-directed scheduling in high-throughput digital signal processing, IEEE Transactions on CAD and Systems, Vol.14, No.8, Aug. 1995.] shows a method wherein scheduling intervals are gradually reduced until the desired result is obtained. The cost function used to determine which scheduling interval has to be reduced at each iteration only takes the number of parallel data accesses to reduce the required memory bandwidth into account. (1)FDS does not take into account which data is being accessed. Balancing the number of simultaneous data accesses is a local optimization which can be very bad globally. In IFDS all data is treated equally, although in practice some simultaneous data accesses are more expensive in terms of memory cost than other. Also the required number of memories cannot be estimated accurately by looking locally only, as is done in IFDS, because all conflicts have to be considered for this.

SUMMARY OF THE INVENTION

One aspect of the invention includes a method of determining optimized scheduling intervals and optimized access conflicts useful for determining an optimized memory organization of an essentially digital device, the method comprising: determining an initial scheduling of the data access instructions for a plurality of disjunct blocks, wherein each of the blocks include part of the data access instructions, and wherein at least one of the blocks is executed a plurality of times that is defined by an iteration count, deriving from the initial scheduling an initial block cycle budget for each block, while the overall cycle budget for performance of the digital device is larger than a predetermined overall cycle budget, repeating the method comprising: (a) for substantially all of the blocks, performing the method comprising: temporarily reducing a block cycle budget for a selected block by a predetermined amount; determining optimized scheduling intervals of the data access instructions such that the performance of the digital device is guaranteed to be within the block cycle budgets, wherein determining the optimized scheduling intervals comprises optimizing access conflicts with respect to an evaluation criterion related to the memory cost of the digital device; computing the overall cycle budget resulting from the optimized scheduling intervals; and (b) reducing the block cycle budget for at least one selected block, the selection of the block being based at least in part upon the memory cost and an overall cycle budget reduction.

Another aspect of the invention includes a method of determining a cost-cycle budget curve for an essentially digital device that is represented by a digital representation describing the functionality of the digital device, the representation comprising data access instructions on basic groups of scalar signals, the data access instructions having scheduling intervals, the representation comprising a plurality of disjunct blocks, each block including part of the data access instructions, at least one block being executed at least a plurality of times that is indicated by an iteration count, the method comprising: generating a cost-cycle budget curve that compares the cost of a memory organization of the digital device versus the cycle budget, wherein the cost-cycle budget curve is incrementally generated.

Another aspect of the invention includes a method of determining an optimized memory organization of an essentially digital device represented by a representation describing the functionality of the digital device, the representation comprising data access instructions on basic groups of scalar signals, the data access instructions having scheduling intervals, the representation comprising a plurality of disjunct blocks, each block including part of the data access instructions, at least one block being executed at least a plurality of times, the optimized memory organization being such that execution of the functionality with the digital device is guaranteed to be within a predetermined overall cycle budget, the method comprising: determining block cycle budgets while optimizing scheduling intervals.

Yet another aspect of the invention includes a method of determining an optimized memory organization of an essentially digital device represented by a representation describing the functionality of the digital device, the representation comprising data access instructions on basic groups of scalar signals, the data access instructions having scheduling intervals, the representation comprising a plurality of disjunct blocks, each block including part of the data access instructions, at least one block being executed at least a plurality of times, the optimized memory organization being such that the performance of the digital device is guaranteed to be within a predetermined overall cycle budget, the method comprising: (a) determining initial block cycle budgets such that no access conflict exists between the data access instructions within each block; (b) temporarily reducing, in an iterative process, a block cycle budget by a predetermined amount, and computing the access conflict cost and overall cycle budget reduction of such reduced block cycle budget; (c) reducing the block cycle budget for at least one selected block; and (d) returning to act (b) if the overall cycle budget for execution of the functionality with the digital device is larger than the predetermined overall cycle budget.

Yet another aspect of the invention includes a method optimizing the scheduling of data instructions, the method comprising: determining a scheduling of data instructions for a plurality of blocks; determining a cycle budget for substantially all of the blocks, wherein the cycle budget is determined based at least in part upon the determined initial scheduling of a block; identifying one of the blocks for a cycle budget reduction; reducing the cycle budget of the identified block; modifying the scheduling of at least one of the blocks; calculating a cumulative cycle budget for the blocks; and repeating the identifying, reducing and modifying, wherein the modifying includes modifying a modified scheduling until the cumulative cycle budget for substantially all of the blocks satisfies a predetermined cycle budget.

Yet another aspect of the invention includes a system for optimizing the scheduling of data instructions, the system comprising: means for determining a scheduling of data instructions for a plurality of blocks; means for determining a cycle budget for substantially all of the blocks, wherein the cycle budget is determined based at least in part upon the determined initial scheduling of a block; means for identifying one of the blocks for a cycle budget reduction; means for reducing the cycle budget of the identified block; and means for modifying the scheduling and cycle budget of at least one of the blocks until a cumulative cycle budget for substantially all of the blocks satisfies a predetermined cycle budget.

Yet another aspect of the invention includes a digital device having an optimized memory organization, wherein the design of the memory organization is generated by the method comprising: determining an initial scheduling of data instructions for a plurality of blocks, wherein the data instructions are to be executed by the digital device; determining a cycle budget for substantially each of the blocks, wherein the cycle budget is determined based at least in part upon the determined initial scheduling of the block; identifying one of the blocks for a cycle budget reduction; reducing the cycle budget of the identified block; modifying the scheduling of at least one of the blocks; repeating the identifying, reducing and modifying acts, wherein the modifying act includes modifying a modified scheduling, until a cumulative cycle budget for substantially all of the blocks satisfies a predetermined cycle budget, and wherein the modified scheduling is used to define the design of a memory organization for the digital device.

BRIEF DESCRIPTION OF THE DRAWINGS

FIG. 1 shows at the left side code representing the functionality of a digital system to be designed. The overall conflict graph for each of said schedules and a memory organization of said digital device being compatible with said graph are shown in row two and three respectively.

FIG. 2 shows at the left side code representing the functionality of a digital system to be designed. In the local optimization column is an optimization method shown which optimizes each of the blocks in said code separately. In the global optimization column is an optimization method shown which optimizes the block all together.

FIG. 3 shows source code type description of the invented method for performing a global optimization of the storage bandwidth optimization.

FIG. 4 shows at the left side again code. The right side shows the cycle budget distribution over the blocks changes while optimizing. For left to right the result of more optimized schedulings are shown in terms of cycle and the approaching of the target cycle budget.

FIG. 5 shows a cost, here energy, cycle budget curve being obtained while executing the method in an incremental way.

FIG. 6 shows the cycle budget reduction while optimizing and the relation with the cost figures (being actual and estimated power consumption here).

DETAILED DESCRIPTION OF THE INVENTION

The invention presents a method and a design system incorporating said method for designing essentially digital devices with a hierarchical flow graph representation, said method incorporating partly a design method, suited for designing essentially digital devices with a flat flow graph representation, the latter design method being disclosed in patent application U.S. Ser. No. 09360140, herein fully incorporated by reference. Devices with a hierarchical flow graph representation are defined as devices with a functional representation containing loops and/or function calls.

Figure 9:
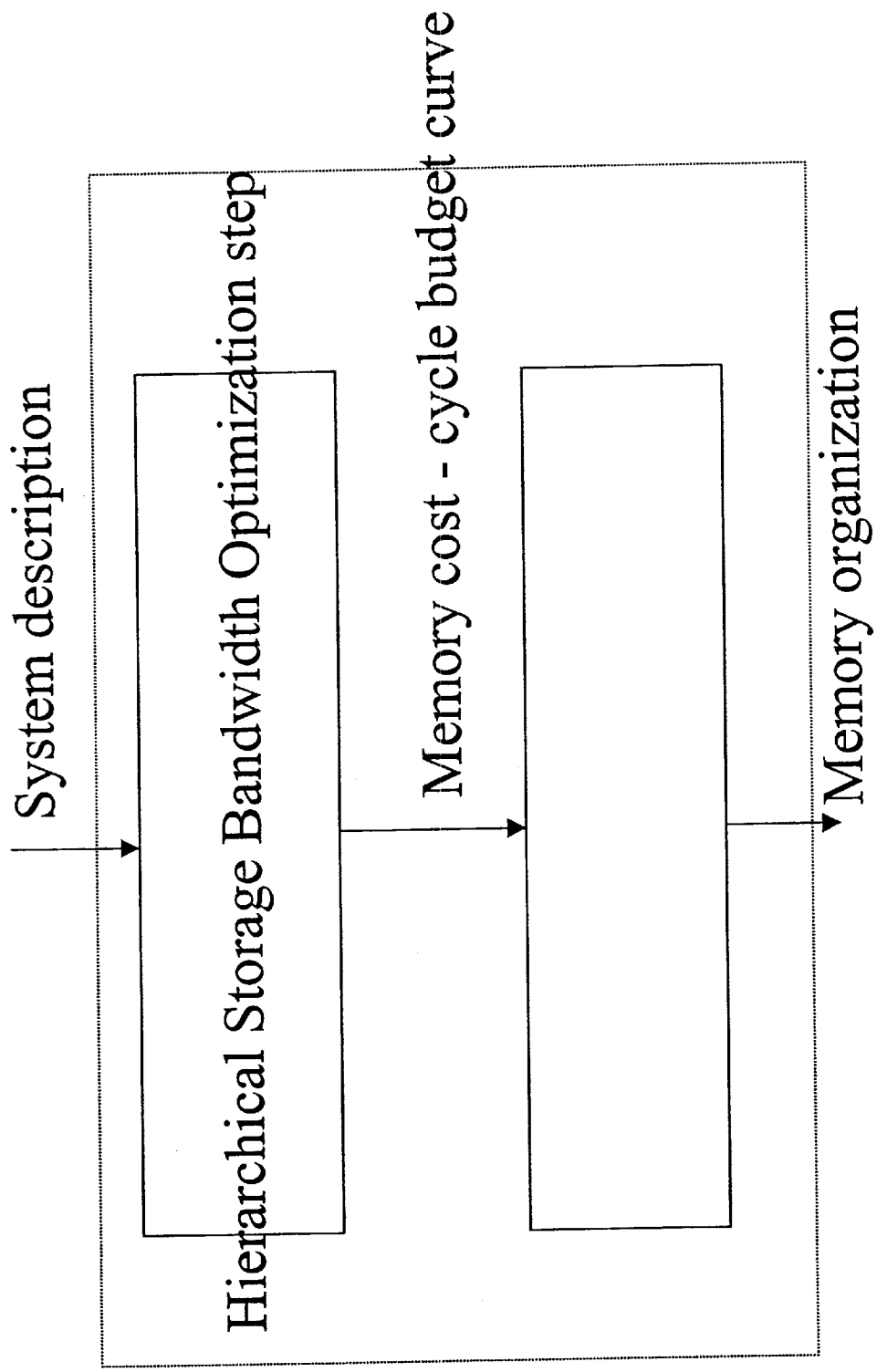
FIG. 9 is a flow chart illustrating a process of optimizing a memory organization.

With the invention a memory organization for an essentially digital device is obtained starting of from a system description. Such a system description can be a source level description but is not limited thereto. The hierarchical nature of the digital device representation result in a storage bandwidth optimization step, producing a memory cost versus cycle budget curve, from which a memory organization can be selected for instance by the system designer as indicated in FIG. 9.

Figure 1:
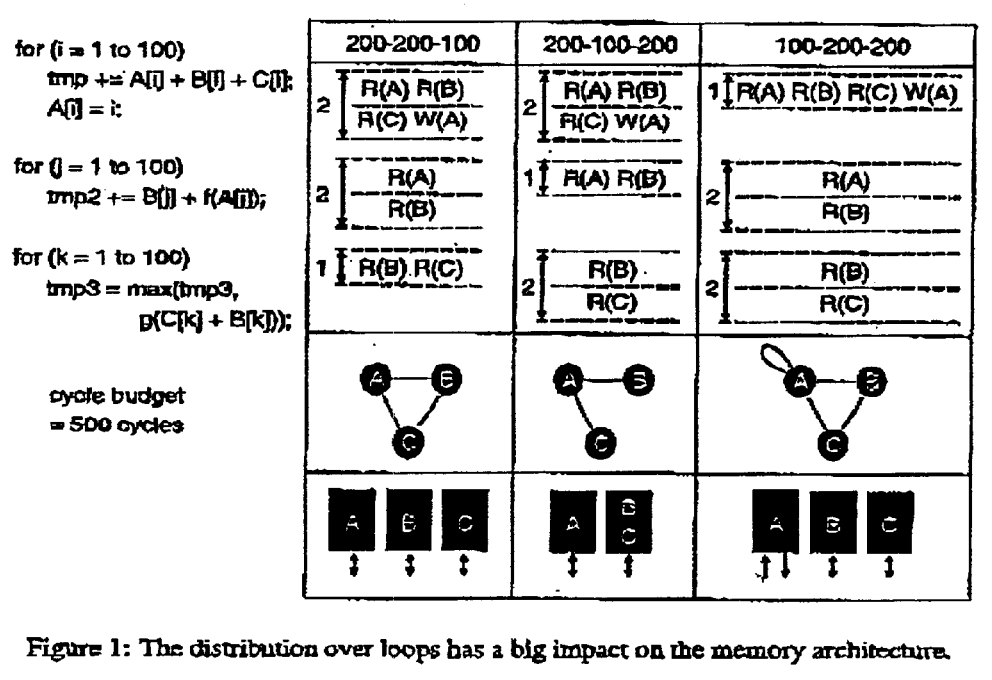

The main goal of the storage bandwidth optimization inspired design methods, both for devices with a flat- and hierarchical graph representation, is to find which basic groups, being groups of scalar signals, such as arrays, must be stored in different memories, being part of the memory organization of said digital system under design, in order to meet the cycle budget, e.g. resulting in completion of the functionality to be executed by said digital device within a predetermined amount of time. Note in FIG. 1 a source type description wherein arrays A, B and C are accessed, meaning being read (denoted R(A)) and/or values being stored in said arrays (denoted W(A)). The method works at the level of basic groups, meaning that the arrays will be evaluated as a whole. The individual signals defined by the arrays elements are not considered separately, meaning that an access to A[1] and A[2] are considered as an access to A. Splitting of arrays is of course possible but the main concept is that groups of signals such as array elements are considered. When the basic groups are defined and a scheduling of the data access instructions, meaning indicating in which order they will be executed, is given, one can by inspection of that schedule determine whether access conflicts exist. There is an access conflict between two basic groups, indicated by a line or arrow in a conflict graph (2e row in FIG. 1) when in the schedule simultaneous accesses to said basic groups are found. Although such simultaneous accesses can be beneficial from the point of view of duration of execution as a shorter execution time is obtained, there is a memory cost involved. Indeed when a memory constellation or organization is selected wherein said basic groups can be stored when using a certain schedule, it is observed that conflicting basic groups must be assigned to separate memories. Comparing of the first and second column of FIG. 1 shows this. Note in column 3 a self-conflict for basic group A resulting in a two port memory wherein A is stored. The data access possibilities are indicated by an arrow in row 3. A single double sided arrow indicates a single port memory with read/write possibilities. A single sided arrow indicates a port with either a read or write possibility, hence two single sided arrows indicated a dual port memory with a port with read and a port with write possibilities. Ordering the memory accesses, meaning determining scheduling intervals, being time intervals, for the data access instructions on basic groups, within a certain number of memory cycles determines the required memory bandwidth. Note that with memory is meant any type of storage means used within digital systems or devices.

If two memory accesses are ordered in the same memory cycle, they are in conflict and parallelism is required to perform both accesses. These simultaneous memory accesses can be done in two different memories, or, if it is the same array in a dual port memory. Thus, the conflict constrains the signal to memory assignment and incurs a certain cost. A tradeoff has to be made between the performance gain of every conflict and the cost it incurs. On the one hand, every array in a separate memory is optimal for speed and seemingly also for power. But having many memories is very costly for area, interconnect and complexity and due to the routing overhead also for power in the end. Due to presence of the real time constraints and the complex control and data dependencies, a difficult tradeoff has to be made.

The invention relates to a method for determining an optimized memory organization of an essentially digital device represented by a representation describing the functionality of said digital device, said representation comprising data access instructions on basic groups, being groups of scalar signals, said data access instructions having scheduling intervals, said optimized memory organization being such that execution of said functionality with said digital device is guaranteed to be within a predetermined overall cycle budget.

Note that the concept of memory cycles does not have to equal the (data-path) clock nor the maximum access frequency of the memory, it is only used to describe the relative ordering of memory accesses. Every memory access is assumed to take up an integer number of abstract cycles. A memory access can only take place in a cycle after any access on which it depends. The found ordering does not necessarily have to match exactly with the final schedule (complete scheduling, including data-path related issues). It is produced to make sure that it is possible to meet the real time constraints with the derived memory architecture. Hence the scheduling obtained with the method can also be denoted a partial ordering or partial scheduling, meaning that said scheduling intervals are typically larger than the amount of cycles needed for performing the memory access.

The flat flow graph design method disclosed in U.S. Ser. No. 09360140 dealt with a single (flat) flow graph within the given time constraints. The flow graph is for instance extracted from a C input description. Internally, it constructively generates a (partial) memory access ordering steered by a sophisticated cost model which incorporated global tradeoffs and access conflicts over the entire algorithm code. The cost can include memory size/area and the cost thereof, power consumption of the device and mainly the memory related power consumption, latency and all possible cost factor, for which estimations can be made from a high level description. The memory related power consumption cost model is typically based on memory size, access frequency and other high level estimates (e.g., possibilities for array size reduction). The technique used for this is to order the memory accesses in a given cycle budget by iteratively reducing the intervals of every memory access (starting with ASAP and ALAP). The interval reductions are driven by the probability and cost of the potential conflicts between the accesses. An Extended Conflict Graph (ECG) is generated which follows out of the memory access ordering. It contains the conflicting arrays which are accessed simultaneously. These arrays need to be stored in different memories. Note that many possible orderings (and also schedules) are compatible with a given ECG. A consolidation of the memory organization is needed in the subsequent memory allocation and assignment step.

A method for determining an optimized memory organization for essentially digital systems with loops or function calls, hence having a hierarchical flow graph representation, hence a non-flat flow graph, is now presented. Said method aims at avoiding the destruction of hardware or code reuse possibilities present in the original specification while performing a storage bandwidth optimization step. Further said method provides an approach with a complexity being far less than the complexity than would be obtained when applying the method, being dedicated for systems without loops or function calls, on a specification with unrolled loops and inlined function calls.

The application code can be considered to be partitioned in blocks corresponding to function bodies, loop bodies and conditional branches. Each statement of the code belongs to one and only one block. A block can be defined as a code part which contains a flat flow graph. It can contain multiple basic blocks and condition scopes. Even the function hierarchy can be adapted to the needs of ordering freedom. In practice, the term loop body and block coincide; all loop bodies are defined as a separate block and the body of a nested loop is part of an other block. It is assumed that at least one of said disjunct blocks, each block including part of said data access instructions, is executed at least a plurality of times, as indicated by the iteration count, associated to each block.

A method is presented for determining an optimized memory organization of an essentially digital device represented by a data access instruction representation describing the functionality of said digital device, said representation comprising of a plurality of disjunct blocks, each block including part of data access instructions, at least one block being executed at least a plurality of times, inicated by said blocks iteration count.

Because the number of iterations to the blocks is mostly different, the storage bandwidth optimization problem is increased in two directions. First, the distribution of the global cycle count over the blocks need to be found within the timing constraints and while optimizing a cost function. Second, a single memory architecture must satisfy the constraints of all blocks, and therefore the global (common or shares for essentially all blocks) extended conflict graph cost must be minimized.

Figure 8A:
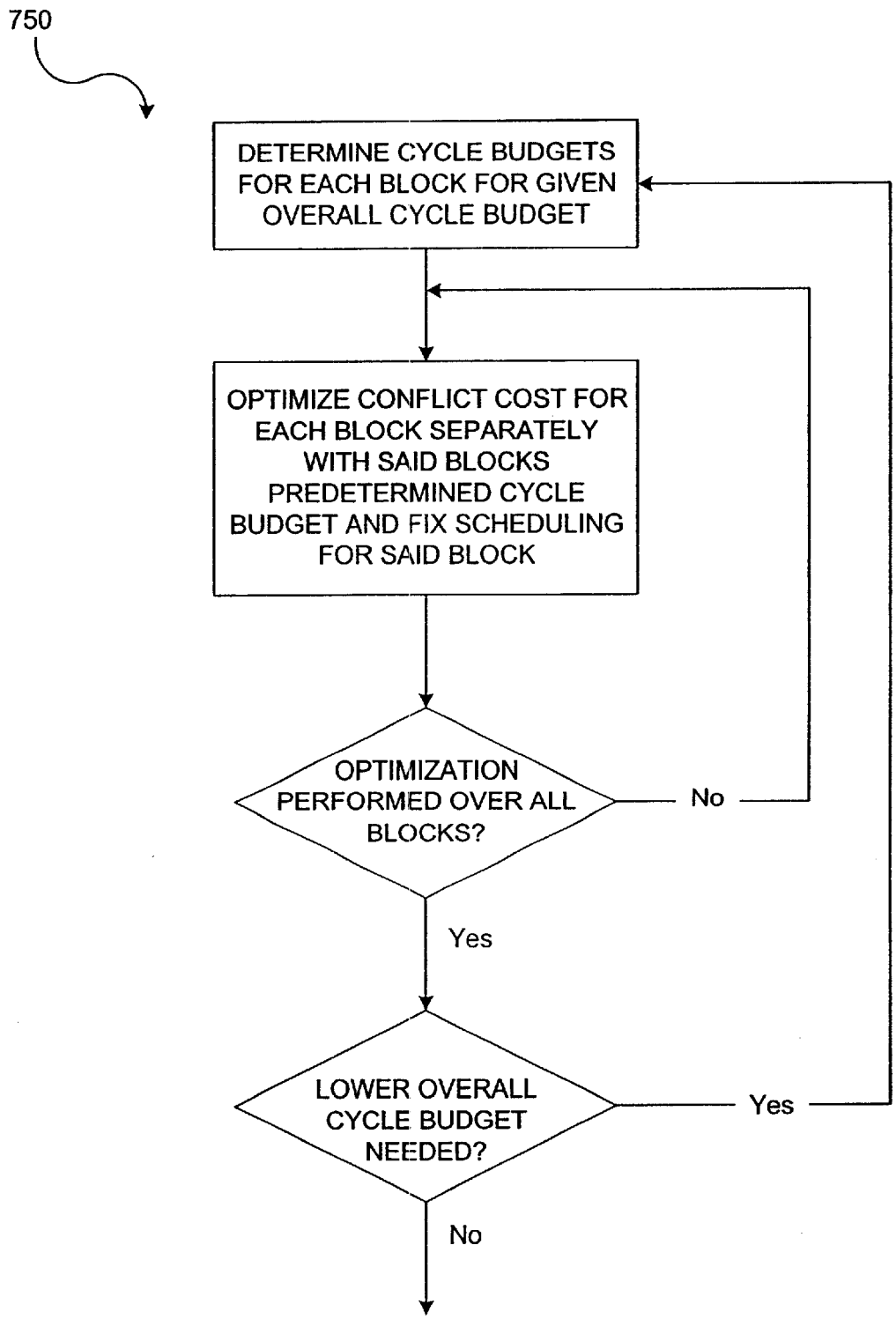
FIG. 8a shows a flow chart of an approach wherein a preprocessing for block cycle distribution is done.

In U.S. Ser. No. 09360140 the distribution of the global cycle count over the blocks was performed as a preprocessing step (750) as shown in FIG. 8a before the extended conflict graph cost being minimized. Combining all the conflicts of the locally optimized blocks in the global conflict graph can lead in certain cases to a poor result for instance in cases where reuse of the same conflict over different blocks is essential. The method now presented is intended for improving storage bandwidth optimization for said cases without the need for performing a preprocessing distribution step and still with acceptable computational complexity.

It is assumed that an overall throughput constraint (maximal or average) is put forward for the entire application. For instance, in a video application the timing constraint is 40 ms to arrive at 25 frames per second. Sometimes, additional timing constraints are given.

The distribution of the cycles over the blocks is crucial. A wrong distribution will produce a too expensive memory architecture because the memory access ordering cannot be made nicely in some of the blocks while there are cheap cycles available in other blocks. Every single block affects the global cost of the memory subsystem. Therefore, if cycle budget of one block is too tight (while there is space in other blocks) it will cause additional cost. The global cycle budget can be distributed over different blocks in many different ways, as shown in FIG. 1. At the left side of the figure a program at the left side, in code type format representing the functionality of a digital system to be designed, is given containing 3 consecutive loops (for construct), defining 3 blocks (within the scope of the for-loop), to be ordered in 500 cycles (hence defining the overall cycle budget given for executing said digital device functionality). The table of FIG. 1 shows three different distributions with each a different cycle budget distribution over said blocks and a good ordering/schedule matching the distribution. The overall conflict graph for each of said schedules and a memory organization of said digital device being compatible with said graph are shown in row two and three respectively. The resulting conflict graph and cheapest memory architecture is given in the last two rows. Obviously, the second solution (loop-i 2 cycles, loop-j 1 cycle and loop-k 2 cycles) is the cheapest solution. The very poor third distribution even forces a dual-ported memory (due to assignment of one cycle for loop-i). The illustration here is based on a simplified example to show the problem. But in fact, the problem in real-life applications is much more difficult. First, because more signals, accesses and blocks are involved, the number of different possible distributions increases. Second, the number of block iterations will not be equal for each block. The impact on the global time elapse of one block is much bigger than another block. Hence, there is more freedom in the search space. FIG. 1 indicates that different cycle budget distributions can have an enormous effect on the conflict graph and the cost of the memory organization.

A global optimization over all blocks is needed to obtain the global optimal conflict graph. Ordering the memory accesses on a block per block basis will result in a poor global result. The local solution of one block will typically not match the (local) solutions found in other blocks. Together, the local optima will then sum up to an expensive global solution as shown in FIG. 2. Solving the problem locally per block will lead to different conflict graphs. The total application has one memory architecture and therefore one global conflict graph only. The memory architecture cannot change from one block to the next. Therefore, all the block (local) conflicts graphs should be added to one single global conflict graph. A typical conflict mismatch is shown in the left side of FIG. 2. A fully connected global graph is the result, requiring four memories. Ordering the memory accesses with a global view can potentially "reuse" conflicts over different blocks. When the different blocks use the same conflicts, as shown at the right hand side of FIG. 2, the global conflict graph and the resulting memory architecture are much cheaper. Again, the simpler example shows the essence of the problem. However, the real problem is much more complex.

FIG. 2 thus compares a local optimization method shown which optimizes each of the blocks in said code separately, leading to a completely covered conflict graph and an expensive memory organization with the invented global method which optimizes the block all together, leading to conflict re-use, and hence a conflict graph with less conflicts and a cheaper memory organization.

A method is presented for determining an optimized memory organization of an essentially digital device represented by an appropriate representation, the method determines block cycle budgets while optimizing said scheduling intervals. Hence no preprocessing step for block cycle budget distribution (as shown in FIG. 8a, (750)) is needed. Instead during calculation for each overall cycle budget obtained one can assign for each block the related cycle budget selected in (700). Note that the decision making (700) on which block the cycle budget reduction will be applied and hence using the related scheduling for said block as determined in (600) is performed after optimization of each block.

Moreover for substantially all said blocks said combined or interleaved block cycle determination and optimizing said scheduling intervals exploit the same global conflict graph to be optimized. Thus for substantially all said blocks, one select a block, denoted the selected block, one determines optimized scheduling intervals of said data access instructions such that execution of said functionality with said digital device is guaranteed to be within all the block cycle budgets, said block cycle budgets are fixed at that moment except for the block cycle budget of the selected block which is reduced, said optimizing access conflicts within a single global conflict graph with respect to an evaluation criterion related to the global memory cost of said digital device.

The method suited for digital systems with a hierarchical flow graph representation, generating a storage cycle budget distribution over multiple blocks, incorporates a method suited for digital systems with an essentially flat flow graph representation, more in particular by placing said latter method in a loop, iterating over substantially all the blocks. As motivated before as such, this could leads to a poor global optimum. Therefore a special way of iterating over said blocks is performed. Indeed one starts with initially large block cycle budgets, the value of said block cycle budget for instance being such that between the data access instructions within one blocks no access conflict exist. In this example one derives from said no access conflict condition said initial block cycle budgets. The total cycle budget, being defined by said block cycle budgets and the iteration count of said blocks, will usually be larger than the predetermined overall cycle budget wanted. Said iteration over said blocks is not so that first the minimal block cycle budget of a first block is determined and thereafter for another block. Instead a limited and temporarily, hence not yet approved, block cycle budget reduction of essentially all said blocks is examined, meaning its influence on the access conflict cost is determined, then at least for one of said blocks its cycle budget reduction is applied, and the procedure is started all over again.

Figure 7B:
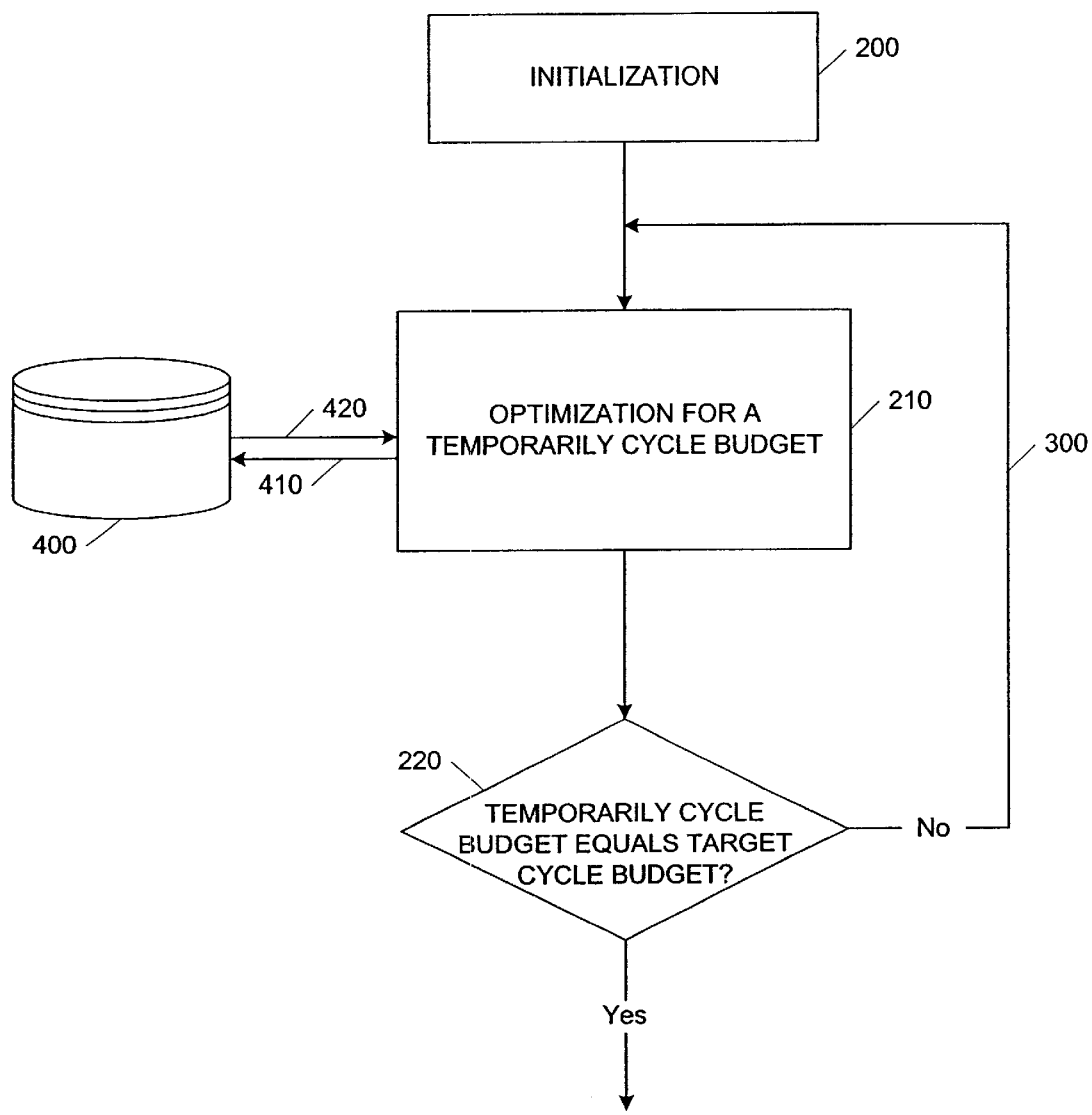
FIG. 7b shows a flow graph, indicating the storage of previously determined information for use in next iterations.
Figure 8B:
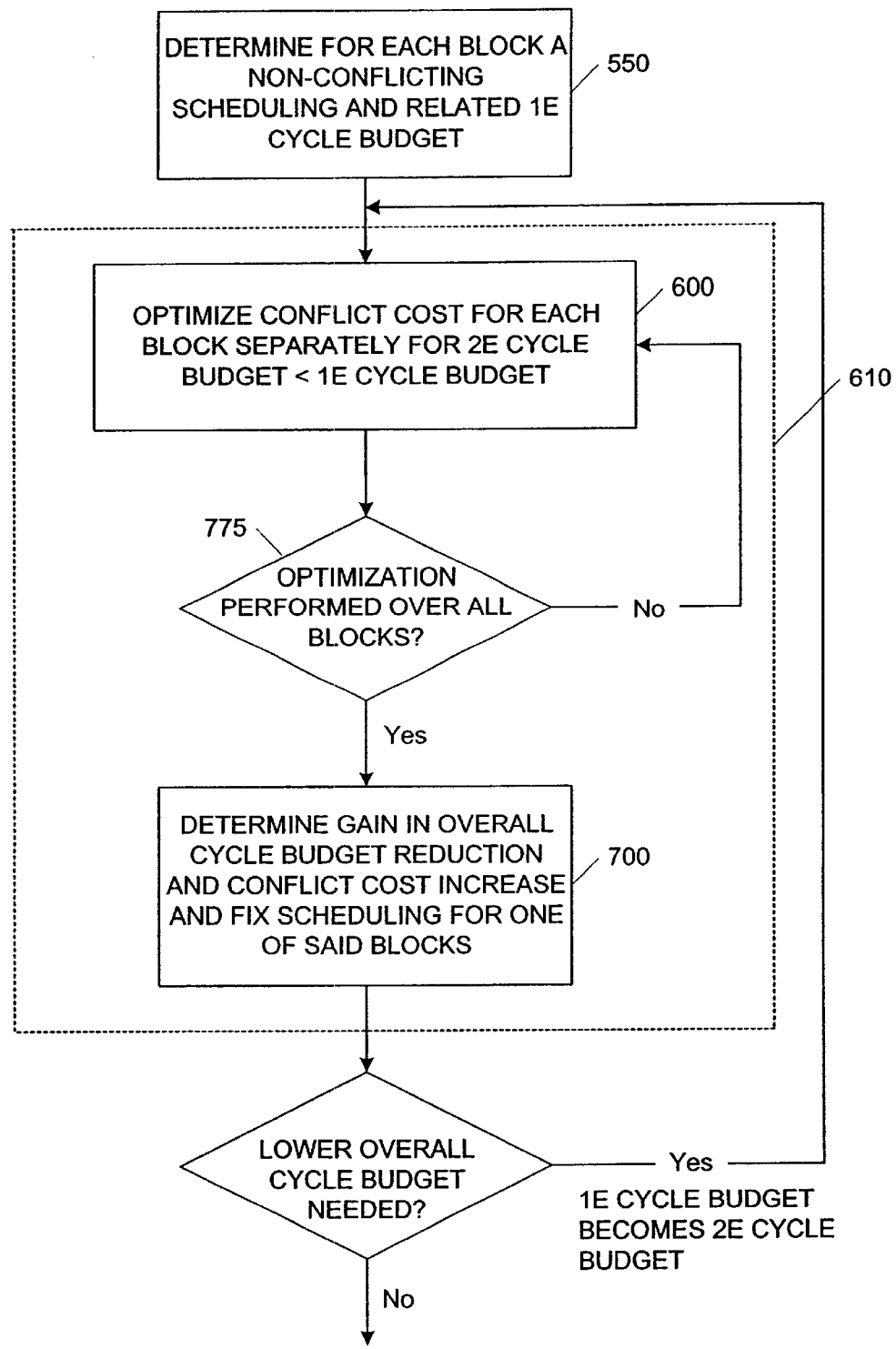
FIG. 8b shows a flow chart showing the incremental approach.

A method is presented, as shown in FIG. 8b, for determining an optimized memory organization of an essentially digital device represented by an appropriate representation, the method comprises the steps of determining initial block cycle budgets, for instance such that between the data access instructions within each block no access conflict exist (550) and as long as the overall cycle budget for execution of said functionality with said digital device is larger than said predetermined overall cycle budget (substep 1) iteratively performing over substantially all said blocks a temporarily reducing the selected block cycle budget with a predetermined amount (600)(610), computing the access conflict cost and overall cycle budget reduction, (substep 2) applying for at least one selected block said block cycle budget reduction (700) and returning to substep 1. Note that (775) in FIG. 8b can in an embodiment of the invention be the block (210) of FIG. 7b.

It must be understood that the initialization step (550) determines for each block a first initial cycle budget, denoted 1e cycle budget. In step (600) for one block its cycle budget is reduced hence one obtains a 2e cycle budget lower than the 1e cycle budget and an associated cost due to that reduction. For the other blocks their cycle budget is not reduced if they are not the block under consideration in the step. The process of reducing for one block the cycle budget is done for essentially each block via iteration (610). So for each block a 2e cycle budget is obtained and an associated cost. By comparing in step (700) the gain reduction of the overall cycle budget, being affected by the block cycle budget reduction, with the conflict cost increase, one determines for which block the cycle budget is approved. For that block and only that block (in a single block embodiment) the 2e cycle budget becomes the 1e cycle budget while the others remain at their 1e cycle budget. So one performs an update of single block cycle budget.

FIG. 3 shows a source code description of the method for performing a global optimization of the storage bandwidth optimization approach. The global optimization is also an incremental approach starting off with a too large target budget, computing the associated minimal cost and reducing said target budget until the cycle budget requirement is met. Note that for optimization of hierarchical code, hence code with blocks due to loops or function calls, a so-called flat graph like optimizer, used for optimization of flat code, hence code without blocks can be used. However this flat graph solver is not used with a fixed cycle budget distribution over said blocks. Instead cycle budgets for each of said blocks are generated while optimizing. Important is to notice that there is a gain/cost analysis for essentially all blocks and only thereafter a decision for typical one block.

Note that although the method steps (53) with the method step (51) are done for essentially all blocks there is actually an update for less blocks (one or more) based on gain/cost analysis (700, FIG. 8b). FIG. 4 indicates that after a first iteration (80) block (11) its cycle budget is reduced from 5 to 4 (resulting due to the 5 times iterations in an overall cycle budget for that block of 20) while the other blocks cycle budget are unchanged. In the next two iterations block (13) its cycle budget are reduced. The method step (600) of FIG. 8b is performed by executing a flat-graph type optimizer (90) (as shown in the FIG. 3 code).

The design method is an incremental approach, reducing the global cycle budget every step until the target cycle budget is met. Initially, for instance the memory access ordering is sequential. Therefore every block can be ordered without any conflicts. During the iteration over the blocks, the cycle budget is made smaller for every individual block. Gradually, more conflicts will have to be introduced. The storage bandwidth optimization approach decides which block(s) are reduced in local cycle budget and so which conflicts are added globally. Finally, after multiple steps of decreasing the budgets for the blocks, the global cycle budget is met and a global conflict graph is produced.

Figure 7A:
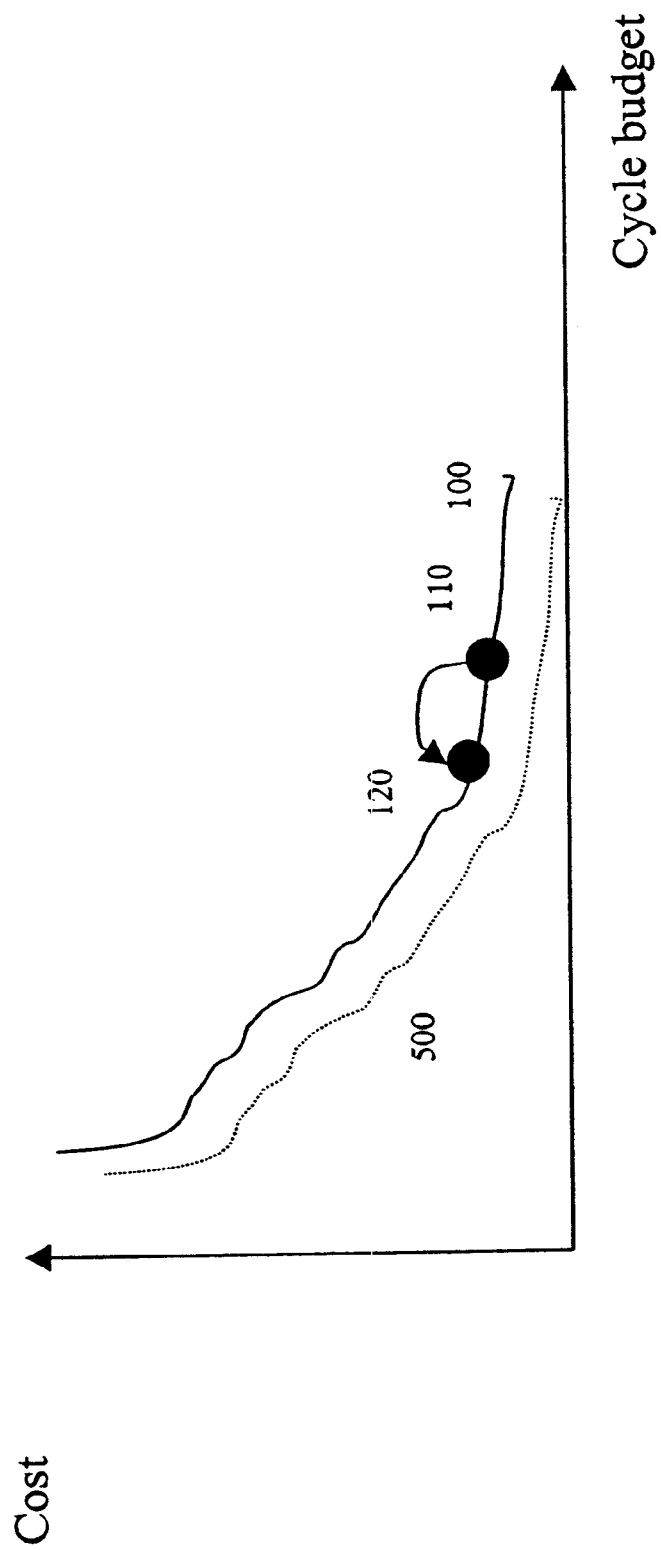
FIG. 7a shows a cost-cycle budget curve and the incremental approach, determining a point of the curve, based on information obtained while determining a previous point with a larger cycle budget.

With incremental is meant that the cost-cycle budget curve (100) in FIG. 7a, is generated in such a way that the computation of point (120) on said curve is based on a previously computed point (110) on said curve. With based on is meant that part of the computations done for point (110) are stored and re-used for computing point (120). Due to the nature of the storage bandwidth optimization problem, preferably said previously computed curve has a large cycle budget. Note that said previously determined point (110). can be an initial point or just a point along the curve. FIG. 7b shows a flow-chart, wherein an initial computation part (200) and a computation part (210) over which an iteration (300) is performed. Said iteration is however not a mere repetition of said computation part (210). While executing said computation part information is stored (410) on storage means (400) and said information is re-used (420) in the next iteration. Said information can be final ordering of a blocks memory accesses obtained during executing said computation part (210), for instance for re-initialization of the next iteration or information on already selected access conflicts for re-use purposes in the conflict cost model or indications on which blocks are rescheduled during such execution. Note that within said iteration loop a decision (220) is needed to select whether another point of the curve must be computed or not. A possible way is that the circuit designer inputs a range for the cycle budget or that the method itself generates a flag, indicating that it is of no use to go to lower cycle budgets as no feasible solutions exist.

Note that said cost-cycle budget curve is an optimized cost-cycle budget. One does not present a cost for a cycle budget but the lowest possible cost for such a cycle budget. Hence said cost-cycle budget is an optimal cost-cycle budget. One can state even that said cost-cycle budget is a Pareto optimal curve, meaning that no lower cost is possible for a given cycle budget and for a specified cost no smaller cycle budget is possible. Naturally the presented optimization approach contains heuristics and hence only an approximation (100) of a Pareto optimal curve (500) is obtained, hence the terminology near Pareto optimal cost-cycle budget curve.

As an example of the proposed method initializes with a sequential ordering. Every memory access has its own time slot. A block containing X memory accesses will have an initial cycle budget of X cycles (assuming one cycle per memory access). Due to this type of ordering, the global conflict graph will not contain any conflicts. In the successive steps of the algorithm the global budget will shrink. Every step, (at least) one of the blocks will reduce in length. The reduction of the block is by a predetermined amount but at least one cycle. Said predetermined amount can for instance by selected by the system designer depending on a trade-off between design speed (completion of the method) and accuracy. A large predetermined amount will increase the design speed but reduce the accuracy. Said predetermined amount can also be selected by the computation system itself based on estimations of the effect of the related block cycle reduction, estimation being determined with easier, more approximate methods than the method step itself, of course. Combination of designer selection and steering by the computation system itself, such as selection of a range by said designer wherein said computation system can choose the block cycle reduction step, is also possible.

However, depending on the number of iterations of the concerning block, the impact on the global budget is much bigger. The global conflict cost change is calculated in the case of the block reduction. But the reduction is not approved yet. The block(s) having the biggest gain (based on a change in total cycle budget and/or change in conflict cost) is actually reduced in size. All the other ordering results in this step are discarded. The cycle budget reduction is continued until the target cycle budget is reached. Due to the block cycle budget reduction, additional conflicts arise. Note that this basic algorithm is greedy, since only a single path is explored to reach the target cycle budget. The traversal of the cycle search space can be made less greedy however. At every step, multiple reduction possibilities exist. Instead of discarding non-selected block ordering information (as proposed in the previous paragraph), these can be selected and explored further. Many of the branches will be equivalent to the already found greedy solutions. Due to this property, the exploration will not explode but still extra solutions can be found. Moreover, a lower bound can also cut off some of the potential branching paths. Note however, due to the heuristics in the flat graph solver, the solution may be different even though the distribution of cycles over the blocks is equal. In this way, the longer the tool will run, the more and (maybe) better solutions can be found.

FIG. 4 shows at the left side code (10) describing the digital system. Within said example code three blocks (11) (12)(13) located each within a loop (for constructs) are recognized. When executing the first step of the method (50) in FIG. 3, (550) in FIG. 8b, for each of said three blocks one obtains a non-conflicting for instance sequential scheduling (60) as indicated in FIG. 4 with an overall cycle budget of 95 cycles and a scheduling of the instructions of block (11) in 5 cycles, resulting due to the 5 times iterations in an overall cycle budget for that block of 25. Then one performs the step (775, FIG. 8b) (51, FIG. 3). Said step will be repeated until the overall cycle budget is equal or lower than the target cycle budget, here 75 cycles as specified by the condition (52, FIG. 3) and the budget cycle condition in FIG. 8b.

To further improve the global result and to avoid a long execution time and unstable behavior, two new inputs can be entered to the flat-graph scheduler. First of all, a list of reusable conflicts can be specified. The internal cost function is adapted to (re)use conflicts which are already used by other blocks if possible.

Before starting said repeating of said substeps, an empty set of re-usable access conflicts is determined for at least one of said blocks and then while performing said step of optimizing access conflicts one takes into account the re-usable access conflicts within said sets of re-usable access conflicts not related to the selected block, being the block which block cycle budget reduction currently under investigation. Finally in substep 2 the set of re-usable access conflicts of said selected block is updated. In a further embodiment scheduling intervals of blocks from which access conflicts within said blocks set of re-usable access conflict are not re-used are not modified during said step of optimizing access conflicts. Note that deciding not to re-use an access conflict can easily be determined by comparing the conflict graphs of the two related blocks. When an access conflict connects at least one basic group which is not accessed by one of said related blocks, then said access conflict is not re-usable and hence not-reused.

Second, the ordering freedom is limited. The returned ordering freedom to a block is based on the final ordering of the previous step. The memory access is scheduled between the ASAP and ALAP time. Both the ASAP and ALAP are put close to the location of the previous ordering. This is a first aspect of the incremental nature of the method. The determining of optimized scheduling intervals steps are thus initialized with scheduling intervals substantially near but a bit larger than the previously determined scheduling intervals, determined in an earlier iteration.

The algorithm is speed up further by reusing ordering results which did not change. Since much ordering information is discarded in a step, this does not mean it is useless.

By keeping track of which blocks have to be rescheduled, the tool execution time can be decreased drastically. This happens especially in large applications containing many independent blocks. This keeping track and hence storage of said change/non-change information is a second aspect of incremental nature of the method.

Figure 8C:
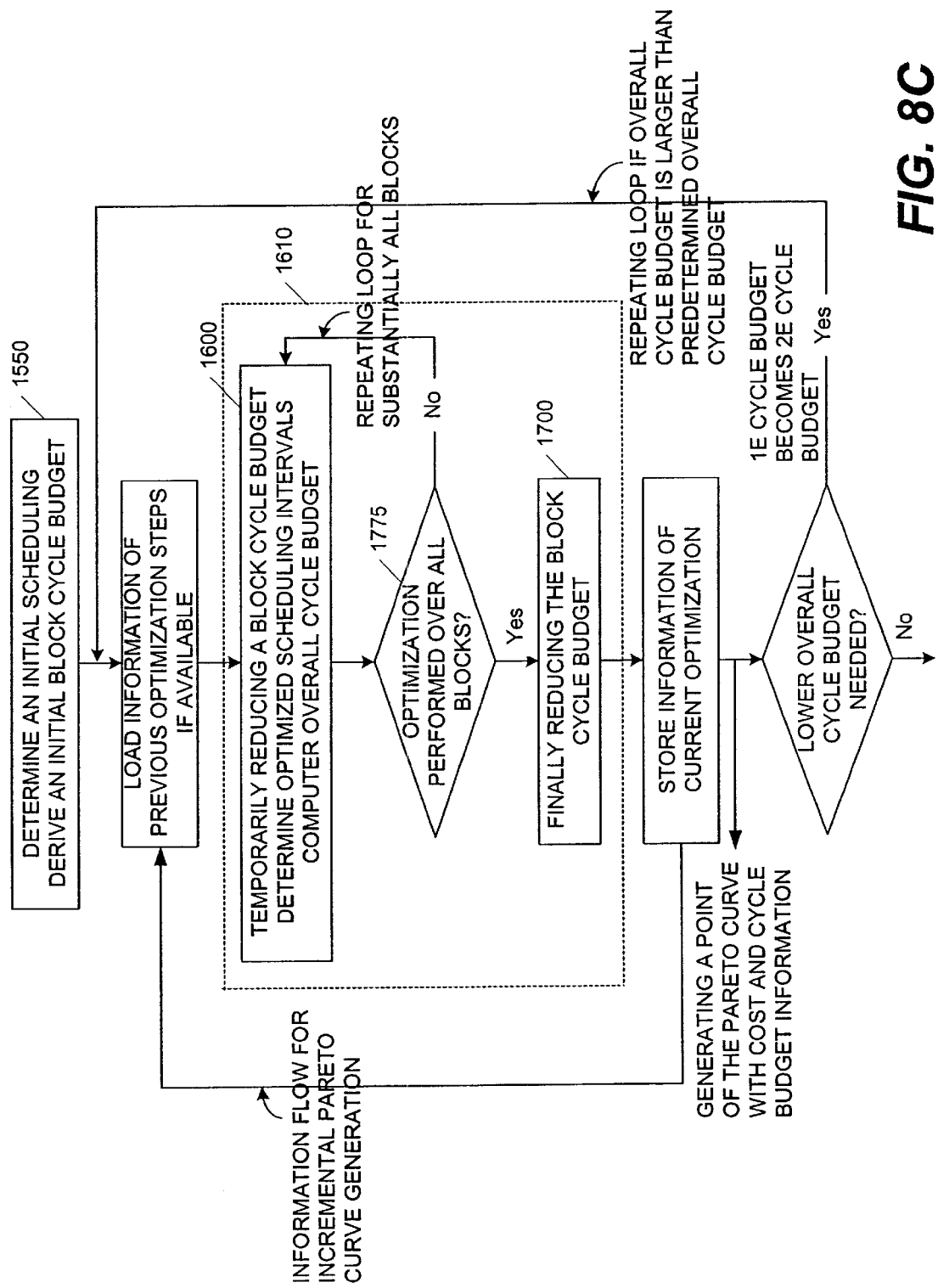
FIG. 8c shows another flow chart showing the incremental approach, wherein explicit the information flow from one optimization (stored) to a next optimization (loading) and the generation of points on the pareto curve.

FIG. 8c shows the optimized memory organization determination method, comprising the steps of initial scheduling and deriving of an initial block cycle budget (1550) (which can be access conflict free in an embodiment of the invention), temporarily reducing a block cycle budget, determining optimized scheduling intervals and computing of the overall cycle budget (1600). Said step (1600) is done in a loop, such that this is executed for substantially all blocks. The method comprises further of the steps of (finally) reducing the block cycle budget 1700. The steps 1550, 1600, 1700 are done in another loop, as long if the overall cycle budget is larger than the predetermined overall cycle budget.

Due to the incremental nature, the steps in this last iteration loop, can exploit information from a previous iteration step by storing information of a current information and loading this for the next optimization. Each iteration of said second loop generates a couple of numbers, more in particular memory cost and cycle budget, defining a point on the Pareto curve.

The following references [Erik Brockmeyer, Arnout Vandecappelle, Sven Wuytack, Francky Catthoor "Low power storage cycle budget distribution tool support for hierarchical graphs" 13th international symposium on system synthesis (ISSS) Madrid, Spain, Sep. 20–22, 2000.],[ Erik Brockmeyer, Arnout Vandecappelle, Francky Catthoor "Systematic Cycle budget versus System Power Trade-off: a New Perspective on System Exploration of Real-time Data-dominated Applications" International Symposium on Low Power Electronics and Design (ISLPED) pp. 137–142, Rapallo, Italy, Aug. 2000.], [Erik Brockmeyer, Arnout Vandecappelle, Sven Wuytack, Francky Catthoor "Low power storage cycle budget distribution tool support for hierarchical graphs", 13th international symposium on system synthesis (ISSS) Madrid, Spain, Sep. 20–22, 2000.] each incorporated, in their entirety, by reference.

What is claimed is:

1. A method of determining optimized scheduling intervals and optimized access conflicts useful for determining an optimized memory organization of an essentially digital device, the method comprising:

determining an initial scheduling of the data access instructions for a plurality of disjunct blocks, wherein each of the blocks include part of the data access instructions, and wherein at least one of the blocks is executed a plurality of times that is defined by an iteration count;

deriving from the initial scheduling an initial block cycle budget for each block;

while the overall cycle budget for performance of the digital device is larger than a predetermined overall cycle budget, repeating the method comprising:

(a) for substantially all of the blocks, performing the method comprising:

temporarily reducing a block cycle budget for a selected block by a predetermined amount;

determining optimized scheduling intervals of the data access instructions such that the performance of the digital device is guaranteed to be within the block cycle budgets, wherein determining the optimized scheduling intervals comprises optimizing access conflicts with respect to an evaluation criterion related to the memory cost of the digital device;

computing the overall cycle budget resulting from the optimized scheduling intervals; and (b) reducing the block cycle budget for at least one selected block, the selection of the block being based at least in part upon the memory cost and an overall cycle budget reduction.

2. The method of claim 1, wherein the initial scheduling is such that no access conflict exists between the data access instructions within each block.

3. The method recited of claim 1, wherein the initial scheduling comprises a sequential ordering.

4. The method of claim 1, wherein the predetermined amount is at least 1.

5. The method of claim 1, additionally comprising:

before repeating the acts (a) and (b), determining an empty set of re-usable access conflicts for at least one of the blocks;

while optimizing access conflicts, utilizing re-usable access conflicts within the sets of re-usable access conflicts that are not related to the selected block; and updating the set of re-usable access conflicts of the selected block in act (b).

6. The method of claim 5, wherein scheduling intervals of blocks from which access conflicts within the set of re-usable access conflict are not re-used are not modified while optimizing access conflicts.

7. The method of claim 1, additionally comprising selecting an optimized memory organization.

8. A method of determining a cost-cycle budget curve for an essentially digital device that is represented by a digital representation describing the functionality of the digital device, the representation comprising data access instructions on basic groups of scalar signals, the data access instructions having scheduling intervals, the representation comprising a plurality of disjunct blocks, each block including part of the data access instructions, at least one block being executed at least a plurality of times that is indicated by an iteration count, the method comprising:

generating a cost-cycle budget curve that compares the cost of a memory organization of the digital device versus the cycle budget, wherein the cost-cycle budget curve is incrementally generated.

9. The method of claim 8, wherein the cost-cycle budget curve is near Pareto-optimal.

10. The method of claim 8, wherein generating a cost-cycle budget curve comprises:

determining an initial scheduling of the data access instructions such that between the data access instructions within each block no access conflict exists in each block and deriving therefrom for each block an initial block cycle budget;

computing a first overall cycle budget resulting from the initial schedule and a first memory organization in accordance with the initial scheduling of the data access instructions, the first overall cycle budget and the cost of the digital device with the first memory organization defining a first point on the cost-cycle budget curve;

while the overall cycle budget for execution of the functionality with the digital device is reducible, repeating the acts:

(a) for substantially all the blocks, performing the method comprising:

temporarily reducing the block cycle budget by a predetermined amount;

determining optimized scheduling intervals of the data access instructions such that execution of the functionality with the digital device is guaranteed to be within block cycle budgets, the determining of the optimized scheduling intervals comprising optimizing access conflicts with respect to an evaluation criterion that is related to the cost; and computing an overall cycle budget resulting from the optimized scheduling, wherein computing utilizes at least in part the iteration count of the blocks;

(b) reducing the block cycle budget for at least one selected block; and (c) adding the overall cycle budget and related cost to the cost-cycle budget curve.

11. The method of claim 10, wherein the initial scheduling is a sequential ordering.

12. The method of claim 10, wherein the predetermined amount is at least one.

13. The method recited of claim 10, additionally comprising:

before repeating the acts (a), (b), and (c), determining an empty set of re-usable access conflicts for at least one of the blocks;

while optimizing access conflicts, utilizing re-usable access conflicts within the sets of re-usable access conflicts not related to the selected block; and updating the set of re-usable access conflicts of the selected block in act (b).

14. The method of claim 13, wherein scheduling intervals of blocks from which access conflicts within the blocks set of re-usable access conflict are not re-used and are not modified while optimizing access conflicts.

15. The method of claim 8, wherein the cost is selected from the group comprising: memory area/size cost, memory related power consumption of the digital device, latency of the digital device, area cost of the digital device, and combinations thereof.

16. The method of claim 8, wherein generating the cost-cycle budget curve initially generates high cycle budgets and progressively generates lower cycle budgets, wherein generating the lower cycle budget exploits the results from high cycle budget computations.

17. The method of claim 16, wherein the exploitation of higher cycle budget computations in lower cycle budget computations comprises re-using access conflicts.

18. A method of determining an optimized memory organization of an essentially digital device, wherein an optimized memory organization is determined based on the cost-cycle budget curve generated by the method of claim 8.

19. A method of determining an optimized memory organization of an essentially digital device represented by a representation describing the functionality of the digital device, the representation comprising data access instructions on basic groups of scalar signals, the data access instructions having scheduling intervals, the representation comprising a plurality of disjunct blocks, each block including part of the data access instructions, at least one block being executed at least a plurality of times, the optimized memory organization being such that execution of the functionality with the digital device is guaranteed to be within a predetermined overall cycle budget, the method comprising:

determining block cycle budgets while optimizing scheduling intervals.

20. The method of claim 19, wherein determining the block cycle budget while optimizing the scheduling interval comprises, interleaving of determining block cycle budgets and optimizing scheduling intervals.

21. The method of claim 19, wherein the block cycle budgets are determined substantially simultaneously while the scheduling intervals are optimized.

22. The method of claim 19, wherein optimizing scheduling intervals comprises optimizing a global conflict graph that is shared by each of the blocks.

23. A method of determining an optimized memory organization of an essentially digital device represented by a representation describing the functionality of the digital device, the representation comprising data access instructions on basic groups of scalar signals, the data access instructions having scheduling intervals, the representation comprising a plurality of disjunct blocks, each block including part of the data access instructions, at least one block being executed at least a plurality of times, the optimized memory organization being such that the performance of the digital device is guaranteed to be within a predetermined overall cycle budget, the method comprising:

(a) determining initial block cycle budgets such that no access conflict exists between the data access instructions within each block;

(b) temporarily reducing, in an iterative process, a block cycle budget by a predetermined amount, and computing the access conflict cost and overall cycle budget reduction of such reduced block cycle budget;

(c) reducing the block cycle budget for at least one selected block; and (d) returning to act (b) if the overall cycle budget for execution of the functionality with the digital device is larger than the predetermined overall cycle budget.

24. A method optimizing the scheduling of data instructions, the method comprising:

determining a scheduling of data instructions for a plurality of blocks;

determining a cycle budget for substantially all of the blocks, wherein the cycle budget is determined based at least in part upon the determined initial scheduling of a block;

identifying one of the blocks for a cycle budget reduction;

reducing the cycle budget of the identified block;

modifying the scheduling of at least one of the blocks;

calculating a cumulative cycle budget for the blocks; and repeating the identifying, reducing and modifying, wherein the modifying includes modifying a modified scheduling until the cumulative cycle budget for substantially all of the blocks satisfies a predetermined cycle budget.

25. The method of claim 24, wherein the reducing the cycle budget of the identified block only modifies the scheduling of the identified block.

26. The method of claim 24, wherein the reducing the cycle budget of the identified block modifies the scheduling of instructions for substantially all of the blocks.

27. The method of claim 24, wherein the initial scheduling are determined such that no access conflict exists in any of the blocks.

28. The method of claim 24, wherein the modifying the scheduling of at least one of the blocks increases the amount of access conflicts in at least one block when compared with the initial scheduling.

29. The method of claim 24, wherein the modifying the scheduling of at least one of the blocks results in an equal amount or more access conflicts when compared to the initial scheduling.

30. A system for optimizing the scheduling of data instructions, the system comprising:
- means for determining a scheduling of data instructions for a plurality of blocks;
- means for determining a cycle budget for substantially all of the blocks, wherein the cycle budget is determined based at least in part upon the determined initial scheduling of a block;
- means for identifying one of the blocks for a cycle budget reduction;
- means for reducing the cycle budget of the identified block; and
- means for modifying the scheduling and cycle budget of at least one of the blocks until a cumulative cycle budget for substantially all of the blocks satisfies a predetermined cycle budget.

31. The system of claim 30, wherein the means for reducing only modifies the scheduling of the identified block.

32. The system of claim 30, wherein the means for reducing modifies the scheduling of instructions for substantially each of the blocks.

33. The system of claim 30, wherein the means for determining an initial scheduling enforces that no access conflict exists in any of the blocks.

34. The system of claim 30, wherein the means for modifying the scheduling increases the amount of access conflicts in at least one block when compared with the initial scheduling.

35. The system of claim 30, wherein the means for modifying scheduling results in an equal amount or more access conflicts when compared with the initial scheduling.

36. A digital device having an optimized memory organization, wherein the design of the memory organization is generated by the method comprising:
- determining an initial scheduling of data instructions for a plurality of blocks, wherein the data instructions are to be executed by the digital device;
- determining a cycle budget for substantially each of the blocks, wherein the cycle budget is determined based at least in part upon the determined initial scheduling of the block;
- identifying one of the blocks for a cycle budget reduction;
- reducing the cycle budget of the identified block;
- modifying the scheduling of at least one of the blocks;
- repeating the identifying, reducing and modifying acts, wherein the modifying act includes modifying a modified scheduling, until a cumulative cycle budget for substantially all of the blocks satisfies a predetermined cycle budget, and wherein the modified scheduling is used to define the design of a memory organization for the digital device.

* * * * *

UNITED STATES PATENT AND TRADEMARK OFFICE
CERTIFICATE OF CORRECTION

PATENT NO.    : 6,449,747 B2
DATED         : September 10, 2002
INVENTOR(S)   : Sven Wuytack et al.

It is certified that error appears in the above-identified patent and that said Letters Patent is hereby corrected as shown below:

<u>Title page,</u>
Item [75], please add -- Erik Brockmeyer, Leuven, Belgium; and Arnout Vandecappelle, Schilde, Belgium; -- as named inventors.

Signed and Sealed this

Ninth Day of September, 2003

JAMES E. ROGAN
*Director of the United States Patent and Trademark Office*